United States Patent [19]
Zweigardt

[11] 3,850,209
[45] Nov. 26, 1974

[54] FILLING DEVICE FOR ELECTRIC STORAGE BATTERIES

[76] Inventor: Herbert Zweigardt, Breslauer Str. 8, 6233 Kelheim, Germany

[22] Filed: Mar. 20, 1973

[21] Appl. No.: 342,976

[30] Foreign Application Priority Data
Apr. 20, 1972 Germany............................ 7214990

[52] U.S. Cl.................................. 141/198, 137/451
[51] Int. Cl............................................ B65b 57/06
[58] Field of Search ............ 137/68, 408, 592, 451, 137/434; 119/78; 141/198–229, 392

[56] References Cited
UNITED STATES PATENTS
1,010,562  12/1911  Woodward.......................... 137/451
1,208,274  12/1916  Besler ................................. 137/592
2,241,636  5/1941  Eliason .............................. 137/451
2,849,020  8/1958  Goff.................................... 137/408

*Primary Examiner*—Houston S. Bell, Jr.
*Attorney, Agent, or Firm*—Herbert L. Lerner

[57] ABSTRACT

A device for filling or adding fluid to a storage battery includes a valve tubing having a float mounted thereon and disposed in flotation response to the liquid level in the battery. The valve tubing has a kink or bend therein disposed such that as the liquid level rises in the battery, the float rises to displace a portion of the valve tubing and close the interior passage of the valve tubing at the kink or bend to preclude further filling of the battery with fluid.

4 Claims, 1 Drawing Figure

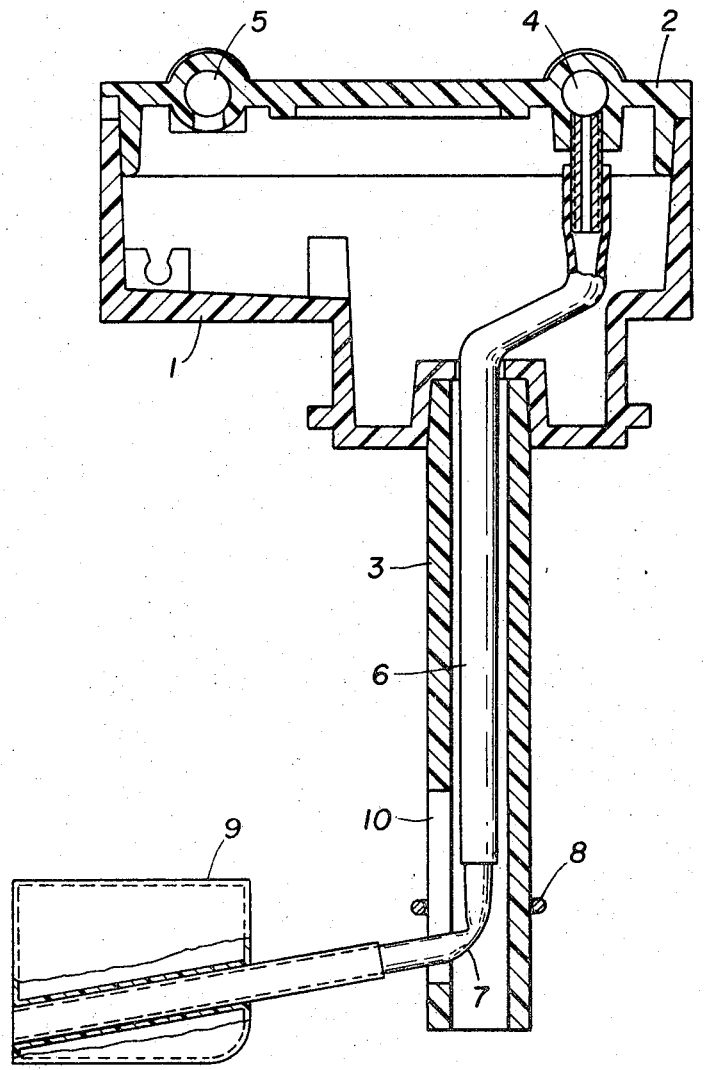

FILLING DEVICE FOR ELECTRIC STORAGE BATTERIES

This invention relates to a filling device for electric storage batteries and particularly to a filling device having a threaded filling plug projecting into the interior of a cell housing of a storage battery.

Storage batteries are required to be filled before they are put in operation, and during operation, the electrolyte must be replenished from time to time up to a predetermined level. Accordingly, it is necessary to be able to observe the electrolyte level when filling or refilling the cell, and to this end, a great variety of devices has heretofore been proposed and used for this purpose.

In one of these known arrangements, the filling hole in the cell is extended downwardly in the form of a tube which extends to the desired electrolyte level. Separately from the filling hole, a venting hole with a ball valve is associated with each cell. During refilling, the ball valve prevents air from escaping from the interior of the cell, so that the electrolyte, as soon as it reaches the lower edge of the tube in the filling hole, rises in this tube and in this manner, checking becomes possible in the course of refilling. By utilizing or putting on a cover strip, the valve balls are then pushed from their seated position and thereby release the vent openings. The cover strip itself is provided with a channel which connects the vent openings of the individual cells with each other. However, with this known arrangement, automatic filling or refilling of distilled water into storage batteries is not possible.

German Patent 1,882,050 discloses a storage battery having a battery case which is closed by a hollow lid. The hollow lid has a filling hole which is closed by a venting plug and has as many discharge openings as the battery has cells. Each discharge opening leads from the space in the lid to the upper part of a cell, and for each opening there is provided a float valve responsive to the level of the electrolyte. The float valve has a bulb-like extension which cooperates with a conical surface on the discharge opening. The disadvantage of this refilling device resides in the fact that due to the small buoyancy forces acting on the float, reliable closing of the filling hole is not assured.

Accordingly it is an object of the present invention to overcome the disadvantages of the above-mentioned refilling devices and to provide an automatic refilling and venting device which makes it possible to feed to the individual cells of a storage battery distilled water or electrolyte through a common refill supply line, without the need to remove the individual plugs, and which assures the automatic maintenance of a defined filling level of the individual cells.

According to the invention, the aforementioned object is achieved by providing a valve tubing disposed in a guide tube which projects into the storage cell. The valve tubing is connected to an electrolyte supply tank or a tank for distilled water. The valve tubing in the region of its discharge opening in the storage cell is provided with a float and the supply of liquid can be shut off by means of a kink or bend in the valve tubing as the electrolyte level in the storage cell rises and the float rises to cause the kink or bend to close off the passage in the valve tubing.

Other features which are considered as characteristic for the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing which is a sectional view, in elevation, of a filling device for an electric storage battery according to one embodiment of the invention.

Referring to the drawing, there is shown therein a refilling device consisting of a housing 1, made of a material resistant to the electrolyte of the storage battery such as, for example, polyethylene. A guide tube 3 is attached to the housing 1 and may be cemented to the housing 1 or connected to the latter by means of a press fit. The housing 1 also serves, at the same time, as a plug for the storage cell.

The housing 1 is closed by a lid 2, the top side of which has provision for two connection lines 4 and 5. The connection line 5 serves as a venting line and the connection line 4 for feeding in distilled water. This connection line 4 ends at the housing 1 in two connecting stubs, so that several cells can easily be connected with each other or series-connected by means of supply tubing.

The connection line 4 is connected with a valve tubing 6 which preferably is made of silicone rubber and which has, by way of example, an outside diameter of 3 mm and an inside diameter of 2 mm. The valve tubing 6 passes through the guide tube 3 and is kinked or bent sideways, or laterally, as indicated at 7, in the area of an opening 10 in the lower part of the guide tube 3. In the area of the kink or bend 7, the valve tubing 6 has an outside diameter which is reduced down to about 2.5 mm so that an intentional kink point 7 is produced. The length of the valve tubing 6 is such that after assembly the intended kink point 7 is situated underneath the lower edge of a set ring 8 disposed on the guide tube 3.

Alternatively, in lieu of the opening 10 in the guide tube 3, a through-slot may be used, and a further set ring (not shown) may be provided on the guide tube 3 below the valve tubing 6 to serve as a kinking edge for the valve tubing. By moving the set ring, the filling height can be regulated.

The end of the valve tubing 6 is provided with a float 9, for example, in the form of a thin-walled bubble of polypropylene. All of the edges and corners of the float 9 are rounded and its shape may be adapted to the space available in the storage cell. The float 9 is fastened to the valve tubing 6, for example, by cementing.

During assembly the float 9 is placed into the interior of the cell through the plug hole in the lid of the cell casing. The hole in the lid of the casing is then closed by the housing 1 of the refilling device. The float 9 rests within the cell on the covering section which covers up the sets of plates, and the valve tubing 6 is angled off or extended laterally or approximately 90° as shown in the drawing. When the cell casing is connected to the refilling system, the battery liquid will pass through the valve tubing 6 into the interior of the cell. As the liquid level rises, the float 9 and thereby the laterally extending portion of the valve tubing 6 is lifted or raised and the kink point 7 of the valve tubing 6 is pressed against the lower edge of the set ring 8. After the required filling level is reached, the further supply of battery liquid is shut off as the kink point 7 completely closes. The seal obtained with the tubing of the dimensions hereinbefore set forth is sufficient for about an 800 mm water column. When the seal is not shut off, the feed rate is approximately 18 milliliter per minute.

The filling device according to the invention makes it possible to fill a storage cell with a definite amount of electrolyte without using or requiring complicated special devices or to maintain a definite electrolyte level during operation through the supply of distilled water. The filling device described is usable for lead storage batteries as well as for nickel-cadmium storage batteries or for other storage batteries.

I claim:

1. In an electric storage battery cell having a battery casing closed by a lid, with a hole therein, the battery casing containing a battery liquid and a set of plates, a filling device located in the hole in the lid which comprises:
   a. a filling plug including a water feed tube, and a guide tube, the guide tube extending downward into the interior of said battery casing, the guide tube including an opening in the lower part thereof;
   b. a flexible valve tube having a first and a second end, the first end being connected to the water feed tube and the second end being open;
   c. the valve tube passing downward through the guide tube, out the opening in the lower portion thereof and forming a bend;
   d. a set ring located on the lower portion of said guide tube adjacent the opening in the lower portion thereof and the valve tube passing under the set ring forming a bend about the set ring; and,
   e. a float attached to the valve tube between the open end thereof and the bend whereby as said float rises the interior passage of said valve tube at said bend is closed.

2. A filling device for an electric storage battery having a housing and a filling plug projecting into the interior of the housing, comprising a guide tube projecting into the interior of said housing, valve tubing for receiving an electrolyte or fluid for said battery, said valve tubing extending at least partially into said guide tube, said valve tubing having a float means carried thereon and disposed for flotation in response to the liquid level in said battery, said valve tubing having a bend therein disposed such that as the liquid level rises in the battery, said float rises to thereby displace a portion of said valve tubing and close the interior passage of the valve tubing at said bend to preclude further filling of the battery with fluid and a set ring disposed on said guide tube, said set ring being movable on said guide tube to adjust the filling height of the liquid in said battery.

3. A filling device for an electric storage battery according to claim 2, wherein said valve tubing has a reduced wall thickness in the area of said bend.

4. A filling device for an electric storage battery according to claim 2, wherein said float means is a thin-walled blown body.

* * * * *

UNITED STATES PATENT OFFICE
CERTIFICATE OF CORRECTION

Patent No. 3,350,209            Dated November 26, 1974

Inventor(s) HERBERT ZWEIGARDT

It is certified that error appears in the above-identified patent and that said Letters Patent are hereby corrected as shown below:

In the heading to the printed specification, after line 4, insert --Assignee: Varta Aktiengesellschaft, Frankfurt/Main, Germany--

Signed and sealed this 3rd day of June 1975.

(SEAL)
Attest:

RUTH C. MASON
Attesting Officer

C. MARSHALL DANN
Commissioner of Patents
and Trademarks